United States Patent Office 3,022,292
Patented Feb. 20, 1962

3,022,292
INHIBITED MONOMERIC SYSTEMS
Homer J. Sims, Philadelphia, Pa., assignor to Rohm & Haas Company, Philadelphia, Pa., a corporation of Delaware
No Drawing. Filed Nov. 9, 1959, Ser. No. 851,508
14 Claims. (Cl. 260—239.3)

This invention deals with inhibited monomeric systems. It further deals with a method for inhibiting a monomeric compound subject to autopolymerization.

It is known that a great many ethylenic compounds are subject to autopolymerization. This is particularly so when the ethylenic compounds are distilled or sublimed in an attempt to purify them. It is also known that many ethylenically unsaturated compounds can be stabilized or inhibited with certain polymerization inhibitors or stabilizers. Many of the commonly used inhibitors or stabilizers are relatively ineffective, particularly when autopolymerizable monomers are distilled or sublimed. Also, many of the known inhibitors or stabilizers distill along with the vapors so that distillation is not a certain or practical way of providing pure, uniform monomers. Also, many of the known inhibitors or stabilizers contain reactive functional groups, such as amino or phenolic groups, which frequently react with the monomer concerned and substantially thwart the attempted purifying process. Accordingly, it is very difficult to find an inhibitor or stabilizer which is effective and practical, particularly in purifying processes.

According to the teachings of this invention, monomeric compounds susceptible to autopolymerization may be effectively and practically inhibited and stabilized, particularly in the purifying states of operation, by incorporating in the concerned monomer an inhibiting or stabilizing amount of 2,3-dicyanobenzoquinone.

2,3-dicyanobenzoquinone is extremely effective as an inhibitor and stabilizer for ethylenically unsaturated monomers that are susceptible to autopolymerization. The only restriction is that the monomers be of such a structure that they are free of vinyl groups attached directly to an aromatic ring. For reasons not entirely clear, such monomers are not effectively inhibited according to the teachings of this invention. Aromatic groups may be present in the monomer as long as they are not attached directly to a vinyl group. 2,3-dicyanobenzoquinone is particularly effective in situations where a monomer is to be purified and stabilized by distillation, sublimation, or similar processes. It is also an effective inhibitor and stabilizer for storage, transportation, and the like of monomers susceptible to autopolymerization, especially under conditions where the presence of oxygen is kept at a minimum. It is preferred to employ 2,3-dicyanobenzoquinone as an inhibitor and stabilizer in substantially in vacuo situations.

2,3-dicyanobenzoquinone is effective for the present purposes even in trace amounts and it has been repeatedly observed that it is quite effective in measurable amounts down to 0.001% by weight. The upper limit of 2,3-dicyanobenzoquinone employed is governed to a large extent by considerations of economics and convenience but, as a practical upper limit, 3.0% by weight is employed. The preferred range is 0.1–2.0% by weight, particularly when distillation and sublimation processes are contemplated. The above amounts are based on the weight of the monomer to be inhibited. The lower amounts in the range may be employed for storage, weighing, transportation, and the like. While 2,3-dicyanobenzoquinone itself is the most effective inhibitor and stabilizer contemplated in the present instance, there may also be employed 2,3-dicyanobenzoquinones that have been substituted with halogen atoms, such as chlorine, or lower alkyl groups, such as methyl, ethyl, and butyl. It is to be understood that such substituted 2,3-dicyanobenzoquinones come within the gamut of this invention.

The 2,3-dicyanobenzoquinone may be introduced into the monomer concerned by any conventional method and in any of the defined amounts. The monomeric system concerned is thus assured of inhibition and stabilization, particularly when any oxygen present is kept at a minimum; and, then, when it is desired to free the concerned monomer from the 2,3-dicyanobenzoquinone, such may be readily achieved by a distillation, sublimation, or similar technique. The monomer thus purified and stabilized can be polymerized with a minimum of initiator and can be treated in a conventional way with certainty of outcome. There is, therefore, provided a system and method which are highly effective and quite practical.

Ethylenically unsaturated compounds which are effectively inhibited and stabilized by 2,3-dicyanobenzoquinone include a great variety of autopolymerizable monomers that have structures that are free of vinyl groups attached directly to an aromatic ring. These monomers may be hydrocarbons, esters, amides, nitriles, sulfides, lactams, acid halides, or compounds having an isocyanate, isothiocyanate, urea or urethane grouping or other vinylidene or active ethylenically unsaturated compounds. The most valuable effects of 2,3-dicyanobenzoquinone and the aforementioned substituted 2,3-dicyanobenzoquinones are obtained in the substantial absence of oxygen.

Typical esters which may desirably be volatilized from a mixture of ester and 2,3-dicyanobenzoquinone include the alkyl, cycloaliphatic, including cycloalkyl and terpenyl, aralkyl, alkenyl, and aryl esters of acrylic, methacrylic, $\alpha$-chloroacrylic, $\alpha$-cyanoacrylic, $\alpha$-phenylacrylic, itaconic, maleic, fumaric, or other autopolymerizable ethylenically unsaturated acid or such esters having a substituted group or groups non-hydrocarbon in nature and based on oxygen, sulfur, nitrogen, or a halogen. Examples of such esters are methyl acrylate, methacrylate, chloroacrylate, or itaconate; butyl, isobutyl, sec-butyl, or tert-butyl acrylate, methacrylate, or itaconate; hexyl acrylate, methacrylate, or dihexyl maleate; octyl acrylate, methacrylate or dioctyl maleate; dodecyl acrylate, methacrylate, or didodecyl itaconate; hexadecyl acrylate; octadecyl acrylate, or methacrylate, or corresponding maleate, fumarate, or itaconate; cyclohexyl, trimethylcyclohexyl, chlorocyclohexyl, or butylcyclohexyl acrylate, methacrylate, or corresponding maleate; benzyl, methylbenzyl, or chlorobenzyl acrylate or methacrylate; phenyl, chlorophenyl, dichlorophenyl, tolyl, xylyl, butylphenyl, or methylchlorophenyl acrylate or methacrylate; dicyclopentenyl, dicyclopenyl, or terpenyl acrylate, methacrylate, or corresponding itaconate, or maleate; methoxyethyl, butoxyethyl, phenoxyethyl, benzoxyethyl, dodecyloxyethyl, ethoxypropyl, octoxypropyl, chlorophenoxypropyl, ethoxyethoxyehtyl, butoxyethoxyethyl, or butylphenoxyethoxyethyl acrylate or methacrylate; hydroxyethyl, hydroxypropyl, or hydroxybutyl acrylate or methacrylate; dimethylaminoethyl, tert-butylaminoethyl, tert-octylaminoethyl, morpholinoethyl, or tert-octylaminopropyl acrylate or methacrylate; isocyanatoethyl acrylate or methacrylate; ethoxycarbamylethyl acrylate or methacrylate; cyanoethyl acrylate or methacrylate; allyl acrylate, methacrylate, or corresponding maleate; vinoxyethyl acrylate or methacrylate; undecenyl acrylate or methacrylate; nitropropoyl acrylate or methacrylate; or other volatilizable monomeric esters of polymerizably ethylenically unsaturated esters.

Similarly, there may be used vinyl esters of carboxylic acids, such as vinyl acetate, vinyl propionate, vinyl laurate, or vinyl oleate, or vinyl crotonate, vinyl 4-pentenoate, or vinyl sorbate.

Amides of unsaturated acids are also purified by distilling or subliming them in the presence of a 2,3-dicyanobenzoquinone. The amide may be unsubstituted, as acrylamide or methacrylamide or it may have one or two N-substituents, as in N-methylacrylamide, N,N-dimethylacrylamide, N-n-butylmethacrylamide, N-phenylmethacrylamide, N-cyclohexylacrylamide, N-cyclohexyl-N-methylmethacrylamide, N-benzyl-N-methylmethacrylamide, N-allylacrylamide, N-n-dodecylacrylamide, N-n-dodecylmethacrylamide, N,N-diphenylacrylamide, N-acrylylmorpholine, N-methacrylylpiperidine, N,N'-ethylenebisacrylamide, or N-vinyloxyethylacrylamide. Amides and imides of divalent acids may likewise be so treated such as maleimide, N-methyl maleamic acid, N-butyl maleamic acid, N-benzylmaleamic acid, N-butylmaleimide, N-benzylmaleimide, N-allylmaleimide, or N-phenylmaleimide. The unsaturation may be in the N-substituent as well as in the acid residue as in N-vinylsuccinimide. Lactams may likewise advantageously be considered, such as N-vinylpyrrolidinone, N-vinylpiperidinone, or N-vinylcaprolactam, and alkyl substituted N-vinyl lactams. Similarly, methylenelactones can be advantageously purified by the method of this invention, such as methylenebutyrolactone.

Anhydides and acids also come into consideration and also the acid halides, the last benefiting greatly by distillation from a mixture containing 2,3-dicyanobenzoquinone.

Another type of vinylidene compound which may advantageously be purified by distilling in the presence of 2,3-dicyanobenzoquinone comprises the vinyl thioethers, among which there are some sensitive compounds. There may thus be treated butyl vinyl thioether, hydroxyethyl vinyl thioether, cyclohexyl vinyl thioether, benzyl vinyl thioether, tert-dodecyl vinyl thioether, N,N-dimethylaminoethyl vinyl thioether, or ethyleneureidoisobutyl vinyl thioether.

There are numerous other polymerizable vinylidene compounds and also α,β-unsaturated compounds which can advantageously be distilled or sublimed in the presence of 2,3-dicyanobenzoquinone. These include acrylonitrile, methacrylonitrile, β-chloroacrylonitrile, and 2-vinylthiophene.

2,3-dicyanobenzoquinone is a particularly effective inhibitor and stabilizer for acrylic and methacrylic monomers and these typically include acrylonitrile, methacrylonitrile, alkyl methacrylates, alkyl acrylates, acrylamide, methacrylamide, lower alkyl substituted methacrylamides and acrylamides and others known in the art as acrylic or methacrylic monomers. In such systems, 2,3-dicyanobenzoquinone is consistently up to two-hundred fifty times and more as effective as benzoquinone. Surprisingly, 2,3-dicyanobenzoquinone appears to be relatively ineffective with styrene and closely related monomers.

The inhibited and stabilized systems of this invention, as well as the method for inhibiting and stabilizing autopolymerizable monomers, may be more fully understood from the following examples which are offered by way of illustration and not by way of limitation. In all instances in the following examples, without the use of 2,3-dicyanobenzoquinone, polymerization is consistently observed. Parts by weight are used throughout.

*Example 1*

There are introduced into a reaction vessel 100 parts of methyl acrylate and 1.5 parts of 2,3-dicyanobenzoquinone. The resulting mixture is subjected to distillation and there is no noticeable formation of polymer in the apparatus during the distillation. At the conclusion of the distillation, there is no observable polymer formed.

In a similar way, 40 parts of methyl methacrylate is distilled in the presence of 0.025 part of 2,3-dicyanobenzoquinone with similar results.

Likewise, 65 parts of butyl vinyl thioether and 0.10 part of 2,3-dicyanobenzoquinone are distilled with no polymer formation.

*Example 2*

There are added to a reaction flask 50 parts of methacrylamide and 0.02 part of 2,3-dicyanobenzoquinone. The mixture is distilled and there is no observable polymer formed during the process.

In a similar way, 150 parts of ethyl fumarate is distilled in the presence of 1.2 parts of 2,3-dicyanobenzoquinone with similar satisfactory result of no substantial polymer formation. Likewise, 75 parts of methyl maleate is distilled in the presence of 0.60 part of 2,3-dicyanobenzoquinone with like results.

*Example 3*

There are mixed together 100 parts of acrylonitrile and 0.20 part of 2,3-dicyanobenzoquinone. The mixture is then distilled and the acrylonitrile is obtained with no observable amount of polymer formation.

In like manner, 100 parts of methacrylonitrile is distilled with 0.6 part of 2,3-dicyanobenzoquinone with no observable polymer formation.

Similarly, there is satisfactorily distilled in the presence of 0.60 part of 2,3-dicyanobenzoquinone, 85 parts of N,N-dimethylacrylamide and 80 parts of butyl itaconate, respectively, with no observable polymer formation.

*Example 4*

There are mixed together 80 parts of tert-butylaminoethyl methacrylate and 1.0 part of 2,3-dicyanobenzoquinone. The mixture is distilled and the tert-butylaminoethyl methacrylate obtained with no observable polymer formation.

Similarly, employing 0.80 part of 2,3-dicyanobenzoquinone there is distilled 75 parts of vinyl acetate, 80 parts of N-vinylpyrrolidinone, and 100 parts of vinoxyethyl acrylate, respectively. No polymer formation was observed in any instance.

I claim:

1. A composition consisting essentially of a polymerizable monomer that has a structure free of vinyl groups attached directly to an aromatic ring and a stabilizing amount of 2,3-dicyanobenzoquinone.

2. A composition consisting essentially of a polymerizable monomer that has a structure free of vinyl groups attached directly to an aromatic ring and a stabilizing amount in the range of about 0.001%–3.0% by weight of 2,3-dicyanobenzoquinone.

3. A composition consisting essentially of a polymerizable ester of acrylic acid and a stabilizing amount in the range of about 0.001%–3.0% of 2,3-dicyanobenzoquinone.

4. A composition consisting essentially of a polymerizable ester of methacrylic acid and a stabilizing amount in the range of about 0.001%–3.0% of 2,3-dicyanobenzoquinone.

5. A composition consisting essentially of a polymerizable vinyl ester and a stabilizing amount in the range of about 0.001%–3.0% of 2,3-dicyanobenzoquinone.

6. A composition consisting essentially of an ethylenically unsaturated polymerizable amide and a stabilizing amount in the range of about 0.001%–3.0% of 2,3-dicyanobenzoquinone.

7. A composition consisting essentially of an ethylenically unsaturated polymerizable lactam and a stabilizing amount in the range of about 0.001%–3.0% of 2,3-dicyanobenzoquinone.

8. A process for inhibiting the polymerization of a polymerizable monomer that has a structure free of vinyl groups attached directly to an aromatic ring which consists essentially of mixing with said monomer an inhibiting amount of 2,3-dicyanobenzoquinone.

9. A process for inhibiting the polymerization of a polymerizable monomer that has a structure free of vinyl groups attached directly to an aromatic ring which consists essentially of mixing with said monomer an inhibiting amount in the range of about 0.001%–3.0% by weight of 2,3-dicyanobenzoquinone.

10. A process for inhibiting the polymerization of a polymerizable ester of acrylic acid which consists essentially of mixing with said ester an inhibiting amount in the range of about 0.001%–3.0% by weight of 2,3-dicyanobenzoquinone.

11. A process for inhibiting the polymerization of a polymerizable ester of methacrylic acid which consists essentially of mixing with said ester an inhibiting amount in the range of about 0.001%–3.0% by weight of 2,3-dicyanobenzoquinone.

12. A process for inhibiting the polymerization of a polymerizable vinyl ester which consists essentially of mixing with said ester an inhibiting amount in the range of about 0.001%–3.0% by weight of 2,3-dicyanobenzoquinone.

13. A process for inhibiting the polymerization of an ethylenically unsaturated polymerizable amide which consists essentially of mixing with said amide an inhibiting amount in the range of about 0.001%–3.0% by weight of 2,3-dicyanobenzoquinone.

14. A process for inhibiting the polymerization of an ethyleneically unsaturated polymerizable lactam which consists essentially of mixing with said lactam an inhibiting amount in the range of about 0.001%–3.0% by weight of 2,3-dicyanobenzoquinone.

References Cited in the file of this patent

Kice: J. of Polymer Science, vol. 19, pp. 123 and 126 (1956).